Nov. 14, 1933.     Z. O. ST. PALLEY     1,935,419
TRANSFORMER
Filed March 6, 1933

Inventor:
Zoltan O. St. Palley,
by Charles E. Mullan
His Attorney.

Patented Nov. 14, 1933

1,935,419

UNITED STATES PATENT OFFICE 1,935,419

TRANSFORMER

Zoltan O. St. Palley, Pittsfield, Mass., assignor to General Electric Company, a corporation of New York Application March 6, 1933. Serial No. 659,731

4 Claims. (Cl. 172—238)

My invention relates to transformers and more particularly to transformers having windings with adjustable tap connections for changing both the voltage and the phase angle relations between the primary and secondary sides of the transformers. It is sometimes desirable that adjustment or regulation of the voltage ratio of a transformer be accompanied by a corresponding definite adjustment or regulation of the phase angle between the primary and secondary voltages. The relation between the voltage regulation and the phase angle regulation may be definite and fixed in any particular case but may be different for different cases.

In order to illustrate a particular application of the present invention, suppose two electric generating stations connected by a tie line to permit transmission of power from either station to the other. Suppose that the voltages at the busses of the two stations are maintained always with zero phase displacement and that each bus voltage is maintained constant so that the ratio of the two bus voltages is constant. In order to transmit power in a given direction over the tie line, it is necessary to advance the phase angle of the generating station sending out the power and the amount of power transmitted is dependent upon the phase angle. This may be done with a transformer constructed in accordance with the present invention and connected in the tie line between the two stations.

Because of the transformer and tie line regulation between the two generating stations, some regulation of the voltage ratio in the transformer is also necessary to avoid excessive wattless circulating current between the two stations. For a given transfer of power at a given power factor, a definite voltage ratio is necessary and the required voltage ratio adjustment may also be accomplished with a transformer constructed in accordance with the present invention.

The general object of the invention is to provide an improved transformer having windings provided with tap connections and arranged to secure the results which have been explained.

Figure 1:
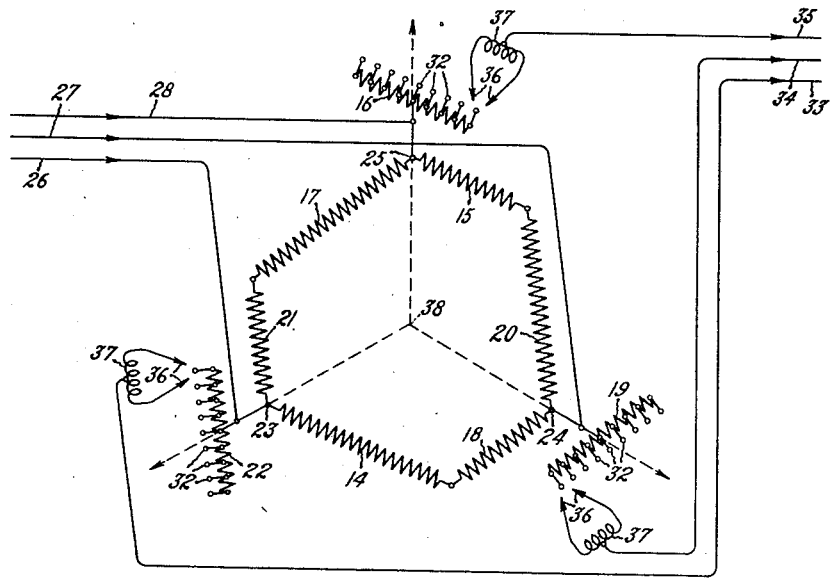
Figure 2:
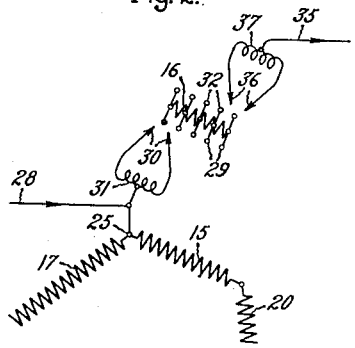
Figure 3:
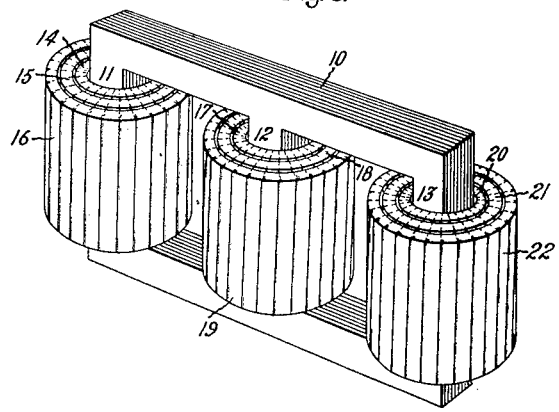

The objects and advantages will be explained in the following description taken in connection with the accompanying drawing in which Fig. 1 is a diagrammatic view of the windings and connections of a transformer constructed in accordance with the invention; Fig. 2 is a perspective view showing the arrangement of the windings on a three phase transformer core; and Fig. 3 is a diagrammatic detail view indicating a modified form of the invention.

The transformer shown in the drawing includes a magnetic core 10 having three winding legs 11, 12 and 13 with three windings 14, 15 and 16 on the winding leg 11, three windings 17, 18 and 19 on the winding 12 and three windings 20, 21 and 22 on the winding leg 13. The windings 14, 18, 20, 15, 17 and 21 are connected together in a series closed circuit as indicated in Fig. 1. The voltages of the three alternate windings 14, 17 and 20 are equal. The voltages of the other three alternate windings 15, 18 and 21 are also equal but may be and usually will be different from the voltages of the first three windings. The voltages of these six windings may thus be represented by a hexagon with opposite parallel sides as indicated by the relative positions of the windings in Fig. 1.

The three alternate connections 23, 24 and 25 between the six windings which produce the vectorial hexagonal voltage form terminals which are connected to the three conductors 26, 27 and 28 respectively of a three phase external circuit and also to the windings 22, 19 and 16 respectively. These connections to the windings 22, 19 and 16, if fixed and permanent, are preferably at the center points of the windings as shown in Fig. 1. The windings 22, 19 and 16 may, however, be provided with tap contacts 29 connected to points distributed along the windings as indicated in Fig. 2 and the terminals 23, 24 and 25 may be connected to the windings through these contacts by adjustable connections which are shown in Fig. 2 as including two movable contacts 30 connected respectively to opposite ends of a small reactor 31 to the center of which the respective terminal is connected. This arrangement permits the connection to be changed from one contact 29 to another without interrupting the load current. To do this, the movable contacts 30 are changed alternately from one contact 29 to another, the reactor 31 preventing excessive circulating current while the movable contacts 30 are on separate fixed contacts 29.

The windings 16, 19 and 22 are provided with tap contacts 32 connected to points distributed along the windings and in the arrangement shown in Fig. 2, the contacts 32 may be connected to the same points to which the contacts 29 are connected. Three external three phase conductors 33, 34 and 35 are connected to the windings 22, 19 and 16 respectively through the contacts 32 and adjustable connections which include two movable contacts 36 connected to opposite ends of a small reactor 37 to the center of which the respective external conductor is connected. This permits the movable contacts 36 to be changed from one fixed contact 32 to another without interrupting the load current as explained in connection with the movable contacts 30 and the fixed contacts 29. The three conductors 26, 27 and 28 and the three conductors 33, 34 and 35 form two sections of a three phase circuit connected by the windings 22, 19 and 16 which serve to change the phase angle and raise or lower the voltage of one section with respect to the other.

The conditions with respect to all three phases are alike and a description of the conditions with respect to one phase only will make the others clear also. Referring to Fig. 1 of the drawing, the voltage of the terminal 25 is the same as that of the conductor 28 and may be represented vectorially by the broken line connecting the neutral 38 and the terminal 25. The voltage of the conductor 35 is the same as that of the point in the winding 16 to which it is connected and is equal to the vector sum of the voltage of the terminal 25 and the voltage of the section of the winding 16 between the points to which the conductor 35 and the terminal 25 are connected. The magnitude of this latter voltage between the terminal 25 and the conductor 35 may be varied or adjusted and its direction reversed by moving the contacts 36 along the fixed contacts 32 of the winding 16. The angular relation of the voltage of the winding 16 with respect to that of the terminal 25 is determined by the ratio of the voltages of the windings 14 and 18 or 20 and 15 or 17 and 21, these ratios of course being always equal. As the voltages of the windings 14, 20 and 17 are increased and the voltages of the windings 18, 15 and 21 correspondingly decreased, the voltages of the windings 16, 22 and 19 approach 90 degree displacement from the voltages of the respective terminals 25, 23 and 24. As the voltages of the windings 14, 20 and 17 are decreased and the voltages of the windings 18, 15 and 21 correspondingly increased, the voltages of the windings 16, 22 and 19 approach 30 degree displacement from the voltages of the respective terminals 25, 23 and 24. Any angular displacement within these limits may be predetermined by providing the proper ratio between the voltages of the windings 14, 20 and 17 and the voltages of the windings 18, 15 and 21.

The arrangement indicated in Fig. 2 is similar to that which has been described in connection with Fig. 1 except that the connections from the terminals 23, 24 and 25 as well as those from the conductors 33, 34 and 35 are adjustable along the windings 22, 19 and 16. This permits the same range of voltage adjustment with only half as many turns in the windings 22, 19 and 16.

By adjusting the movable contacts 36 of Fig. 1 or the movable contacts 30 and 36 of Fig. 2, the phase angle displacement between the three phase voltage of the conductors 26, 27 and 28 and the three phase voltage of the conductors 33, 34 and 35 may be adjusted or varied and at the same time the relative magnitudes of these voltages are varied or adjusted. For a given variation or adjustment of the phase displacement of the voltages, the corresponding variation or adjustment of the relative magnitudes of the voltages depends upon and is determined by the ratio between the voltages of the windings 14, 20 and 17 and the voltages of the windings 18, 15 and 21 as has been explained.

The invention has been explained by describing and illustrating a specific transformer arrangement and construction but it will be apparent that changes may be made without departing from the spirit of the invention and the scope of the appended claims.

What I claim as new and desire to secure by Letters Patent of the United States, is:

1. The combination of six transformer windings in a closed series connection for six phase hexagonal voltage, three terminals for said windings, three windings connected respectively to said three terminals and each having its voltage in phase with that of an adjacent winding of said series, and means for connecting said latter three windings to the conductors of a three phase circuit.

2. The combination of six transformer windings in a closed series connection for six phase hexagonal voltage, three terminals for said windings, three windings connected respectively to said three terminals and each having its voltage in phase with that of an adjacent winding of said series, and adjustable means for connecting selected sections of said three windings between said terminals and the conductors of a three phase circuit.

3. The combination of three transformer terminals, two windings connected in series between each terminal and each of the other two terminals, the voltages of the two windings of each pair being out of phase with each other, three windings having voltages respectively in phase with the voltages of one of the windings of each of said pairs, and adjustable means for connecting selected sections of said three windings between said terminals and the conductors of a three phase circuit.

4. The combination of three transformer terminals, two windings connected in series between each terminal and each of the other two terminals, the voltages of the two windings, of each pair being out of phase with each other and the voltage of each winding being in phase with that of one winding of another pair, three windings having voltages respectively in phase with the voltages of one winding in each of two of said pairs, and adjustable means for connecting selected sections of said three windings between said terminals and the conductors of a three phase circuit.

ZOLTAN O. ST. PALLEY.